(12) United States Patent
Mouard et al.

(10) Patent No.: US 10,137,780 B2
(45) Date of Patent: Nov. 27, 2018

(54) LED INDICATING DEVICE, IN PARTICULAR FOR A VEHICLE INSTRUMENT CLUSTER

(71) Applicant: Magneti Marelli S.p.A., Corbetta (IT)

(72) Inventors: Sylvain Mouard, Magenta (IT); Marco Maraldo, Milan (IT)

(73) Assignee: Magneti Marelli S.p.A., Corbetta (IT)

( * ) Notice: Subject to any disclaimer, the term of this patent is extended or adjusted under 35 U.S.C. 154(b) by 25 days.

(21) Appl. No.: 15/301,832

(22) PCT Filed: Apr. 3, 2015

(86) PCT No.: PCT/IB2015/052469
§ 371 (c)(1),
(2) Date: Oct. 4, 2016

(87) PCT Pub. No.: WO2015/151074
PCT Pub. Date: Oct. 8, 2015

(65) Prior Publication Data
US 2017/0021727 A1    Jan. 26, 2017

(30) Foreign Application Priority Data
Apr. 4, 2014  (IT) .............................. TO2014A0284

(51) Int. Cl.
*B60Q 1/00*     (2006.01)
*B60K 37/02*    (2006.01)
(Continued)

(52) U.S. Cl.
CPC .............. *B60K 37/02* (2013.01); *B60K 35/00* (2013.01); *B60K 2350/1064* (2013.01);
(Continued)

(58) Field of Classification Search
CPC ............................... B60K 37/02; B60K 35/00; B60K 2350/2069; B60K 2350/2008;
(Continued)

(56) References Cited

U.S. PATENT DOCUMENTS

| 4,244,317 A | 1/1981 | Rauch |
| 5,949,346 A | 9/1999 | Suzuki et al. |

(Continued)

FOREIGN PATENT DOCUMENTS

| DE | 102010009254 A1 | 8/2011 |
| DE | 102011014262 A1 | 9/2012 |

(Continued)

OTHER PUBLICATIONS

International Search Report and Written Opinion of the International Searching Authority for PCT International Application No. PCT/IB2015/052469 dated Oct. 7, 2015.

(Continued)

*Primary Examiner* — Dhaval Patel
(74) *Attorney, Agent, or Firm* — Howard & Howard Attorneys PLLC (57) ABSTRACT

An LED indicating device, in particular for a vehicle instrument cluster, has a plate provided with at least one light permeable portion adapted to be illuminated by a plurality of LED sources arranged in a position spaced apart from such a rear surface of such a light permeable portion; the device has a body which is arranged between the LED sources and the rear surface of the light permeable portion and has a first surface facing the LED sources and a second surface facing the rear surface; the body consists of a matrix made of a light impermeable material and of a plurality of light permeable elements, which are embedded in the matrix in positions spaced apart from one another and continuously extend from the first surface to the second surface.

12 Claims, 4 Drawing Sheets

(51) Int. Cl.
*B60K 35/00* (2006.01)
*G02B 6/08* (2006.01)

(52) U.S. Cl.
CPC .............................. *B60K 2350/203* (2013.01); *B60K 2350/2008* (2013.01); *B60K 2350/2034* (2013.01); *B60K 2350/2039* (2013.01); *B60K 2350/2069* (2013.01); *G02B 6/08* (2013.01)

(58) Field of Classification Search
CPC .... B60K 2350/2034; B60K 2350/1064; B60K 2350/203; B60K 2350/2039; G02B 6/08
USPC .................. 340/438, 425.5, 439, 450.2, 462; 362/235, 249.02, 619; 349/12, 65
See application file for complete search history.

(56) References Cited

U.S. PATENT DOCUMENTS 8,408,752 B2 * 4/2013 Sato ...................... B60K 35/00
362/241
2012/0120654 A1 * 5/2012 Kobayashi .............. F21S 8/061
362/235
2014/0002254 A1 * 1/2014 Reuschel ............... B60Q 3/267
340/438
2015/0158423 A1 6/2015 Schwantner

FOREIGN PATENT DOCUMENTS

| DE | 102012014452 A1 | 1/2014 |
| EP | 1162485 A2 | 12/2001 |
| EP | 2110693 A1 | 10/2009 |
| FR | 2860282 A1 | 4/2005 |

OTHER PUBLICATIONS

International Preliminary Report on Patentability issued by the European Patent Office for International Application No. PCT/IB2015/052469 dated Mar. 7, 2015.

* cited by examiner

LED INDICATING DEVICE, IN PARTICULAR FOR A VEHICLE INSTRUMENT CLUSTER

CROSS-REFERENCE TO RELATED APPLICATIONS

The present application is a National Stage of International Patent Application No. PCT/IB2015/052469, filed on Apr. 3, 2015, which claims priority to and all the benefits of Italian Patent Application No. TO2014A000284, filed on Apr. 4, 2014, both of which are hereby expressly incorporated herein by reference in their entirety.

BACKGROUND OF THE INVENTION

1. Field of the Invention

The present invention relates to an LED indicating device, in particular for a vehicle instrument cluster.

2. Description of the Related Art

In a vehicle instrument cluster, as an alternative to common pointer indicators, it is known to also use the so-called bar-graphs, i.e. transparent areas of a dial which have an elongated shape and are back-lit by a row of LEDs to form a light bar having variable length. The length of the lighted part depends on the number of adjacent LEDs which are lit at a given instant and provides visual information on a variable quantity, and in particular about a measurement carried out in the vehicle, e.g. speed measurement, engine RPM, fuel consumption, etc.

The LEDs are normally housed in respective cavities or cells, also called "lightboxes", which are provided with screens to separate the LEDs from one another.

Such screens are normally orthogonal to the dial and extend from a printed circuit board (also referred to as PCB), which supports the LEDs, up to the lower surface of the dial, so as to prevent any light leakage toward the adjacent cavities where the LEDs are off. In the practice, due to this configuration, the back-lighting of the bar-graph forms a set of segments, which are spaced apart by areas which are off or in dim light, due to the presence of the underlying screens. With this configuration, the reading of the value measured on the bar-graph is well defined, due to the absence of light leakage from the lit segments to the dark ones. An example of this type of solution is shown in U.S. Pat. No. 5,949,346A (FIG. 44).

However, the need is felt to have a bar of continuous light, rather than in segments. In this regard, as mentioned above, it is not possible to simply reduce the height and/or the thickness of the screens, as there would be an escape of light from the cavities with LEDs on toward the dark part of the bar-graph, therefore the visual indication of the measurement would not be accurately perceived by the user.

DE102010009254A1 shows a plurality of light conductors, parallel to one another and housed in a body which is arranged between an LED light source and a transparent plate. A movable partitioning wall is then arranged between the light source and such a body.

Preferably, the further need is felt to implement bar-graphs with an elongated shape which is not straight and flat, but with an elongated shape which has a curved pattern.

In applications other than the bar-graphs, the need is also felt to back-light, by means of LEDs, a specific transparent portion of the dial, and to provide one or more bright points which can be distinguished from a background lighting of the illuminated bar-graph, for example by a different color and/or a higher light intensity. Currently, no LED solutions are known which allow to obtain a back-lit graphic area having different colors and/or a back-lit graphic area having a homogeneous background lighting and, at the same time, one or more inner points with higher brightness.

DE102011014262 discloses a lighting device having a panel, provided with a plurality of transparent and non-transparent elements which are arranged one adjacent to the other in an alternating fashion and which each extend completely from the underside to the upper side of the panel. Lighting elements are provided to illuminate the panel from the underside and are controlled to bring about a defined spatial brightness profile on the upper side of the panel.

SUMMARY OF THE INVENTION

It is the object of the present invention to provide an LED indicating device, in particular for a vehicle instrument cluster, which allows the above needs to be met in a simple and cost-effective manner.

According to the present invention, an LED indicating device is provided, in particular for a vehicle instrument cluster, including an LED indicating device, in particular for a vehicle instrument cluster. The device includes a plate comprising at least one light permeable portion; a plurality of LED sources arranged in a position spaced apart from a rear surface of said light permeable portion; a light guide interposed between said LED sources and said rear surface. A control unit acts to control the power supply to said LED sources. The light guide includes a body having a first surface facing the LED sources and a second surface facing the rear surface. The body also has a matrix made of a light impermeable material. A plurality of light permeable elements are embedded in the matrix and continuously extend from said first surface to the second surface. The light permeable elements are embedded in the matrix in positions spaced apart from one another. The second surface is spaced apart from said rear surface.

Other objects, features and advantages of the present invention will be readily appreciated as the same becomes better understood after reading the subsequent description taken in connection with the accompanying drawings.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 1:
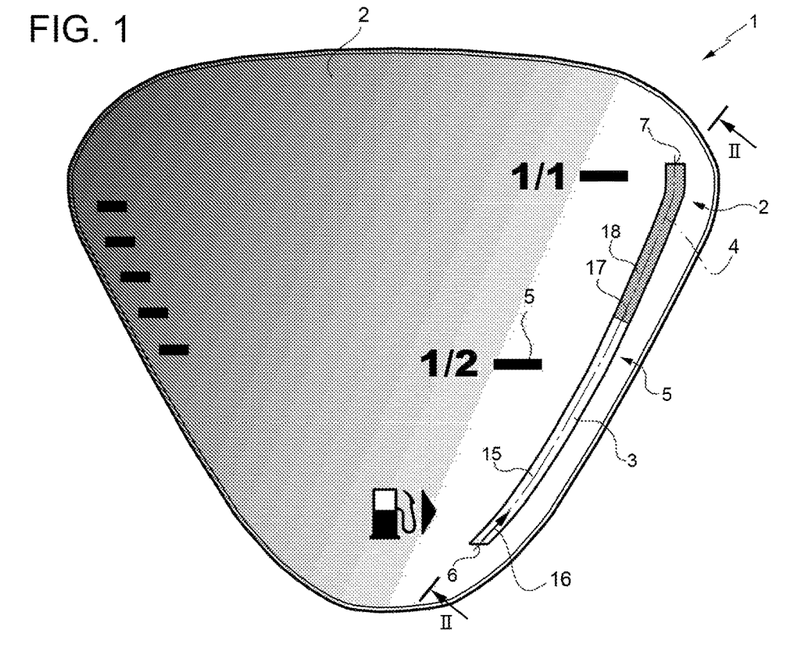
FIG. 1 is a partial front view of a vehicle instrument cluster provided with a preferred embodiment of the LED indicating device according to the present invention.

In FIG. 1, reference numeral 1 indicates, as a whole, a vehicle instrument cluster (partially shown) comprising a dial 2 defined by a plate made of polycarbonate, for example, and having a portion 3 which is light permeable and which can be back-lit to give a user given information.

In particular, portion 3 is defined by a window having a shape which is elongated along a direction 4 (either curved or straight without distinction) and which defines a so-called bar-graph to provide information on a variable quantity corresponding to a measurement carried out in the vehicle. The non-limiting example shown relates to the amount of fuel in a tank.

Window 3 is adjacent to a graduated scale 5, which consists of a plurality of notches which contribute to the reading and interpretation of the quantity indicated by the bar-graph. In particular, window 3 extends along direction 4 from a starting point 6, which corresponds to a minimum value of the graduated scale 5, up to an ending point 7, corresponding to a maximum value of the graduated scale 5.

Figure 2:
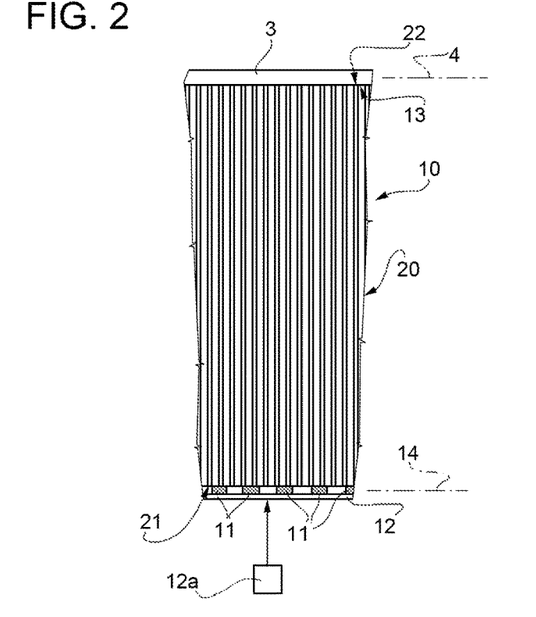
FIG. 2 is a section along line II-II in FIG. 1 and it partially shows a diagrammatic view on enlarged scale of the LED indicating device of the present invention.

As diagrammatically shown in FIG. 2, window 3 forms part of an LED indicating device 10 comprising a plurality of LED sources 11, which are supported by a printed circuit board 12 (also referred to as PCB), are spaced apart by a flat rear surface 13 of dial 2 and are arranged in positions spaced apart from one another along an axis 14 which corresponds to the projection of direction 4 on plate 2. In the particular example shown, axes 4 and 14 are parallel since plate 2 and board 12 are parallel, but in other solutions not shown, plate 2 may be oriented so as to form an angle of incidence with respect to plate 12, or it may have a slight curvature.

LED sources 11 are arranged along one or more rows which are parallel to axis 14 and they are preferably homogeneously distributed on board 12.

Board 12 is configured in a known manner not described in detail to provide power supply to the LED sources 11 and is controlled by a control unit 12a (diagrammatically shown) configured to switch on/off the LED sources 11 independently of one another, in response to at least one input signal.

With reference to FIG. 1, in the specific case of window 3 which defines a bar-graph, the control unit 12a is configured so as to switch on the LED sources 11 one after the other and thus light window 3 in a progression, in one switching on direction 16 from the starting point 6 toward point 7, thus forming a light bar 15 having a variable length depending on the number of consecutive LED sources 11 which have been lit along axis 14.

The light bar 15 therefore has an end 17 which has a variable position in window 3 and, in relation to the graduated scale 5, it provides a visual information of the value measured in the vehicle. Of course, if only some of the LED sources 11 are switched on, from end 17 to point 7, window 5 has a dark area 18.

In addition to this configuration, with which the light bar 15 is formed as an indication of measurement, the control unit 12a may be configured to also form so-called animated effects, without the need for any movable mechanical part. For example, by switching off and on the LED sources 11 in sequence, it is possible to reproduce a luminous cursor running along window 3 from the starting point 6 to the ending point 7, or two luminous cursors running from points 6 and 7 to a central area of window 3. For example, an animated effect of this type or the like may be used to provide the driver with information indicative of the occurrence of a check or a configuration of a component or a restart of vehicle software.

Figure 4:
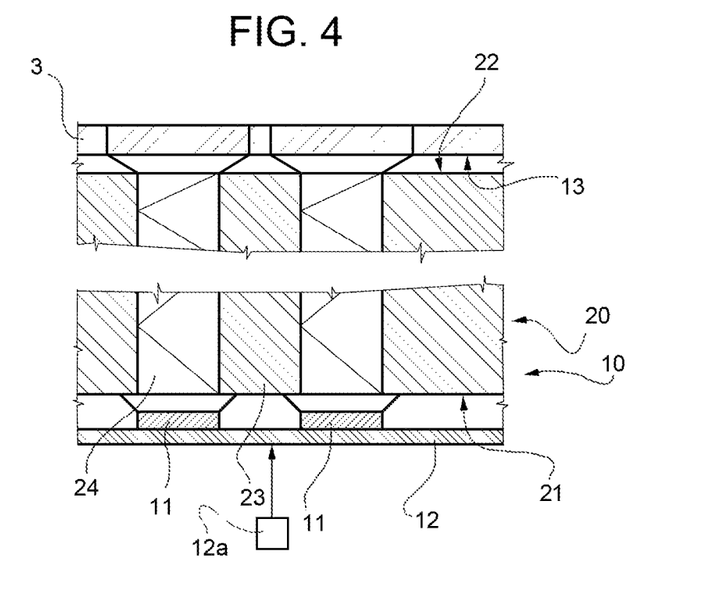
FIG. 4 is a further enlarged view of a detail in FIG. 2.

As shown in FIGS. 2 and 4, device 10 includes a body 20 having a surface 21 facing the LED sources 11, so as to receive the light emitted by the LED sources 11, and configured so as to transmit the light from surface 21 to an opposite surface 22, which faces surface 13. Body 20 carries out the function to transmit the light from the LED sources 11 to surface 13. Advantageously, surface 21 directly faces the LED sources 11, i.e. without interposition of intermediate light-guiding elements or diffusive elements. Surface 21 preferably rests against the LED sources 11, but in some applications this requirement does not affect the functionality of device 10 (such as for a body 20 illuminated with only one color). On the other hand, surface 21 may be specially spaced apart from the LED sources 11 to obtain special effects, as will be explained hereafter.

In one embodiment, surface 22 directly faces surface 13, i.e. without interposition of intermediate light-guiding elements or diffusive elements. In general, however, between surfaces 22 and 13 it is possible to insert one or more light permeable elements or materials configured to create special visual effects, such as a "soft" type effect along the edge of the light bar 15.

Figure 3:
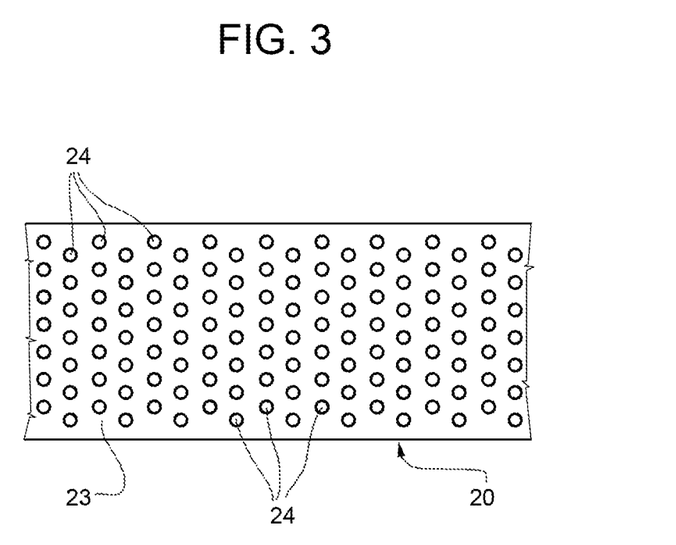
FIG. 3 is a partial front view of a component visible in FIG. 2.

In the particular non-limiting example shown, when body 20 is not deformed, surfaces 21 and 22 are parallel to each other. As shown in FIGS. 3 and 4, body 20 consists of a matrix 2 made of light impermeable material, also called "light-blocking" material, and of a plurality of light permeable elements, indicated with reference numeral 24. Elements 24 are embedded in matrix 23 in positions transversally spaced apart from one another and continuously extend each from surface 21 to surface 22 to guide the light.

The elements 24 are defined by respective filaments which are parallel to one another and, in particular, are orthogonal to surface 21.

In the example shown, such filaments are defined by optical fibers which, as is known, are made of glassy material, consist of a core and a skirt and are particularly advantageous in that they are relatively flexible.

In one embodiment, the material of matrix 21 is elastically deformable, e.g. is defined by elastomeric material, generally dark in color, so as to ensure that the light is not spread therein. Thereby, when assembling device 10, the same body 20 having a parallelepiped shape may be adapted to windows 3 having a non-straight shape, different from one another, therefore the production of body 20 may be standardized within certain limits. The deformation of body 20 also allows it to be adapted to solutions in which dial 2 is not perfectly parallel to board 12 and/or dial 2 is not perfectly flat.

Body 20 may be nicknamed "optical zebra", in analogy to known electrical connectors called "zebra", given their constructive similarity. In fact, the procedure for producing body 20 may be identical to that provided for "zebra" electrical connectors, replacing the electrical conductors with the filaments which define elements 24. With this embodiment, continuous tapes having standard widths may be obtained, which can then be cut into bodies 20 having a parallelepiped shape, or the shape of a strip of the desired length.

The distance between elements 24 must have a minimum value sufficient for the material of matrix 23 to block the scattering of light from any one of elements 24 to the adjacent ones. Therefore, the minimum value to assign to the distance between elements 24 is closely related to the type of material used for matrix 23: for example, a material with a very low transmittance coefficient (i.e. strongly "light-blocking") allows the elements 24 to be very close to one another. On the contrary, a material with weakly "light-blocking" features will involve a greater distance between elements 24.

Once the above minimum distance value has been set, diameter and density of filaments 24 on surfaces 21, 22 are determined mainly based on the size and density of the LED sources 11 on board 12 and depending on the desired optical effects.

Diameter and density of filaments 24 are parameters which influence the light intensity to be transmitted, the homogeneity and the definition (or resolution) of the contours of the area to be illuminated: for example, a larger diameter of filaments 24 allows an increase in luminance; conversely, a large number of filaments 24 of relatively small diameter affects the luminance but allows a better definition of the area to be illuminated.

The density of the LED sources 11 obviously contributes to varying the features of homogeneity, resolution, continuity, etc. of the area to be illuminated.

Accordingly, the right compromise between the various parameters available must be optimally set in the design and development step of device 10, for example by experimental tests.

In the embodiment in FIGS. 2 to 4, at surface 21, each filament 24 faces a single LED source 11. For each LED source 11, there can be provided one or more filaments 24.

The light beam of each LED source 11 is thus carried by one or more filaments 24, which are "dedicated" to such a light beam and carry it up to window 3, without interference of light emitted by other adjacent LED sources 11.

As shown in FIG. 4, due to body 20, the light is guided from the LED sources 11 directly to window 3, whereby the light spreads and/or is dispersed in a very negligible manner. Therefore, body 20 allows the contours of the illuminated area in window 3 to be defined cleanly (i.e. the end 17 of the light bar 15, in the example shown in FIGS. 1 and 2).

The only possibilities of spreading are given by any empty space or "gap" between the LED sources 11 and surface 21, by any empty space or "gap" between surfaces 22 and 13, and inside the transparent material of window 3. A slight spreading of light between surfaces 22 and 13 and/or in the material of window 3 is still essential, since it allows a substantially continuous lighting to be perceived in window 3, instead of perceiving a set of bright dots defined by the ends of filaments 24.

In order to achieve this effect, surfaces 22 and 13 are spaced apart from each other: it is sufficient to set the distance between surfaces 22 and 13 as a function of the distance between two adjacent filaments 24 and as a function of the acceptance cone angle of the light beams emitted by filaments 24 in order to obtain a continuous lighting on surface 13.

In order to obtain a continuous effect of the light bar 15, it is preferable if the empty space or "gap" between the LED sources 11 and surface 21 is negligible. Thereby, the light beam coming out of any one of the LED sources 11 does not interfere with the adjacent ones.

Due to the light guiding function carried out by body 20, it is not essential for the LED sources 11 to be housed in cavities separated by screens. Without such screens, the LED sources 11 can be arranged in positions relatively close to one another compared to the prior art.

In order to further increase the density of the LED sources 11 on board 12, device 10 preferably uses an advantageous arrangement 10: the LED sources 11 are defined by respective electronic circuits or chips which emit light using LED technology, without having any case placed around. In other words, the LED sources 11 are not defined by the common LEDs available on the market and which as known consist of an emitter electronic circuit and a corresponding case. Thereby, the LED sources 11 may be used, which have a maximum size or diameter of less than 25% of the size of the common LEDs available on the market.

In this regard, by way of example, it is noted that LEDs are currently available on the market which are commercially known as MINI TOPLED (registered trademark) and comprise a case substantially shaped as a parallelepiped, having a length of about 2.3 mm and a width of about 1.5 mm and containing an emitter electronic circuit: in this case, it is estimated that the emitter electronic circuit alone may have a diameter of about 0.375 mm. It is apparent that, with such small sizes, it is possible to considerably increase the surface density of the LED sources 11 on board 12 compared to the known solutions.

Figure 5:
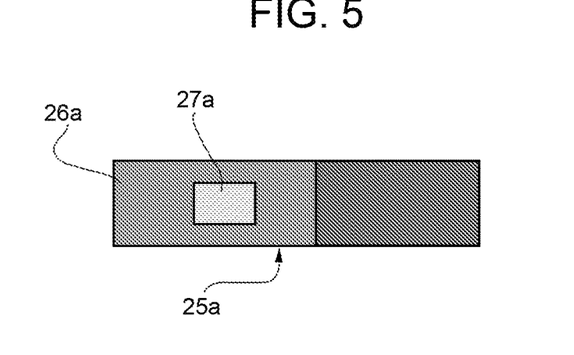
FIG. 5 shows visual effects which may be obtained through the LED indicating device of the present invention.
Figure 6:
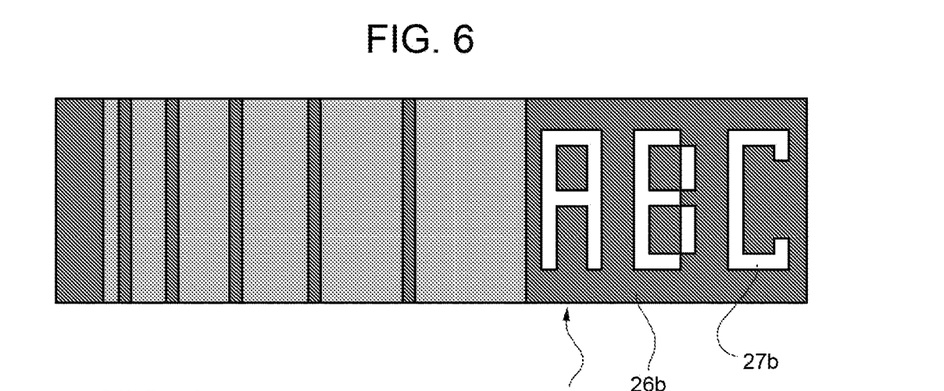
FIG. 6 shows additional visual effects which may be obtained through the LED indicating device of the present invention.

As shown in FIGS. 5 and 6, due to the high densities which can be obtained in the arrangement of filaments 24 and of the LED sources 11, device 10 may be used for back-lighting graphic areas 25a, 25b comprising an area 26a, 26b, which can be illuminated with a background color, and at least one area 27a, 27b which is internal to area 26a, 26b and which can be illuminated differently, i.e. with a different color and/or with a different light intensity.

In order to achieve these effects, one or more LED sources 11 of device 10 have features of color and/or intensity different from the other surrounding LED sources 11.

According to a variant, rather than using LED sources 11 different from one another, a variation in the light intensity between them is achieved via the control unit 12a, which is configured not only to switch on/off the LED sources 11 independently of one another, but also to control a variation in the light intensity from each LED source 11 independently of the others, in response to one or more input signals.

In particular, the control unit 12 is configured to vary the light intensity of each LED source 11 by controlling a variation in the amplitude of the power supply, or by maintaining such amplitude constant and controlling a variation in the supply pulses through PWM.

Due to the possibility of switching on/off the LED sources 11 and, preferably, of varying their light intensity independently, it is possible to:

obtain a bright dot 27a which is distinguished from a background illumination 26a, i.e. a so-called marker (FIG. 5);

obtain any desired wording or information on the graphics area 25b (FIG. 6); in fact, by piloting the switching on/off and/or the light intensity of each LED source 11 according to the above input signals, the control unit 12a is able to vary the number, the extent and the shape of areas 27b compared to area 26b, in order to change the light information emitted by dial 2; body 20 transfers the light image formed by the LED sources 11 to the graphic area 25b, which actually becomes a display whose image definition is essentially represented by the density and diameter selected for filaments 24 in matrix 23, and not only by the LED sources 11 on board 12.

Therefore, one or more markers may be displayed in the bar-graphs, logos may be illuminated also with different colors/brightness, letters or numbers may be illuminated, etc., optionally with flashing light effects, therefore there is a great freedom in the design and implementation of the instrument cluster 1.

Figure 7:
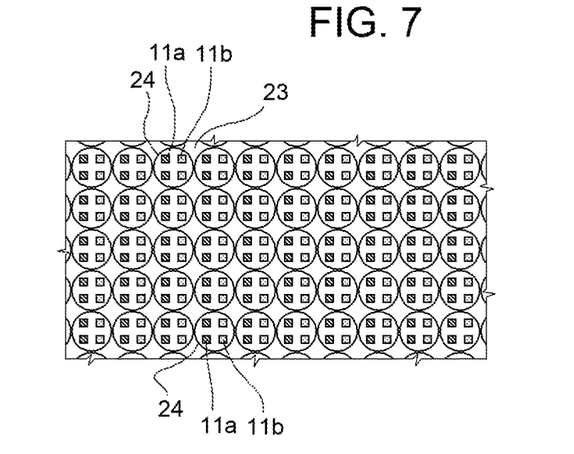
FIG. 7 is similar to FIG. 3 and shows a variant of the LED indicating device in FIG. 2.
Figure 8:
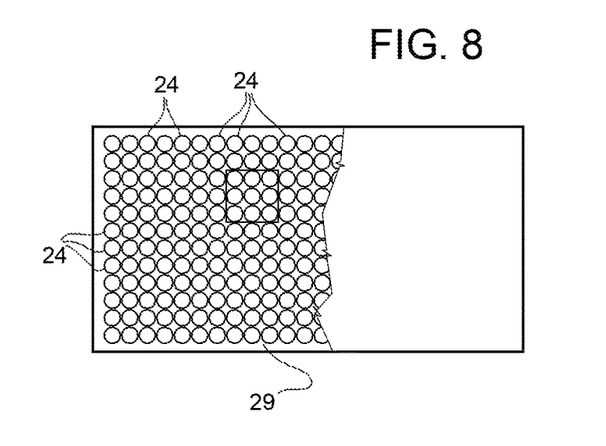
FIG. 8 is similar to FIG. 6 and shows another variant of the LED indicating device in FIG. 2.

In the variant in FIGS. 7 and 8, the diameter and position of filaments 24, compared to the LED sources 11, are set so that each filament 24 is concurrently facing:

at least one LED source 11a adapted to emit a light beam in a first color (or a first light intensity) and at least one LED source 11b adapted to emit a light beam in a second color (or a second light intensity) different from the first one.

The two LED sources 11a and 11b are next to each other and are lit alternatively to each other, in response to what controlled by the control unit 12a, since they can be piloted independently of each other. Therefore, each filament 24 of body 20 can transmit one or the other of the two colors (or light intensities) to a transparent graphic area above, indicated with reference numeral 29 and partially shown in FIG. 8. Thereby, the various areas of the graphic area 29 can be illuminated with different colors (or using different light intensities).

Figure 9:
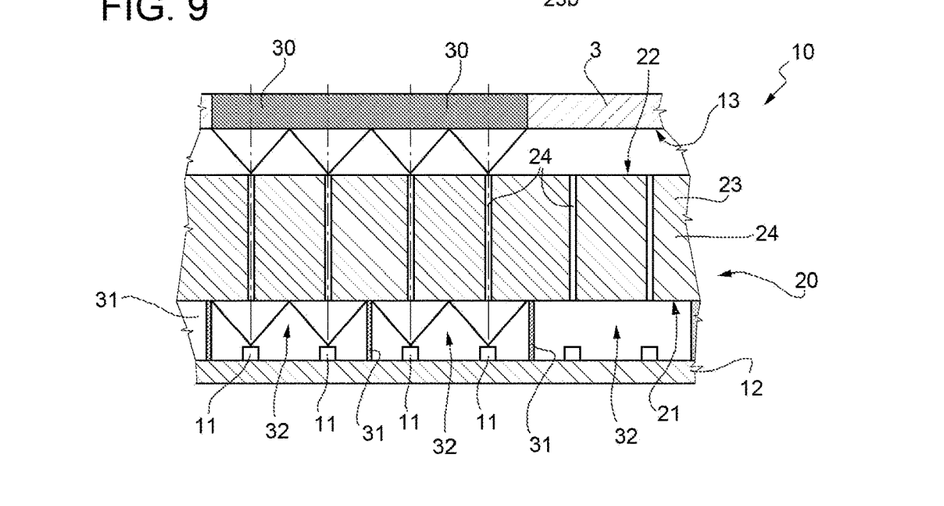
FIG. 9 is similar to FIG. 2 and shows a further variant of the LED indicating device of the present invention.

In the variant in FIG. 9, device 10 allows a light bar 15 with a segment effect without junction line to be obtained, i.e. a light bar consisting of a series of adjacent areas or sectors 30, with relatively long length, each of which is evenly illuminated by a plurality of filaments 24. When they are illuminated at the same time, the adjacent sectors appear without any visible separation line between one and the other.

This function may be ensured by increasing the distance between the LED sources 11 and the surface 21 of body 20 to ensure an even illumination of the set of filaments 24 which are illuminated by every single LED source 11 and thereby to ensure an even illumination of each sector of the light bar 15.

In order to optimally define the extension of the various sectors of the light bar 15, device 10 may include a plurality of screens 31, which are made of a light impermeable material, cantilever from board 12, end at surface 21 and together define a series of cells 32, which are arranged in a succession along axis 14 and house each at least one of the LED sources 11. The light emitted in each cell 32 is transmitted by a plurality of filaments 24 up to surface 22, downstream of which the light has the possibility to spread to form a corresponding sector 30.

The distance between surfaces 13 and 22 is again set so as to have a continuous lighting on surface 13 by the light beams coming out of the adjacent filaments 24, according to the distance between adjacent filaments 24 and to the acceptance cone angle. The distance between surfaces 13 and 22 is preferably set so as to illuminate, on surface 13, also the space which corresponds to the position of the underlying screens 31, so as to avoid light discontinuity between adjacent sectors 30 in the light bar 15.

Figure 10:
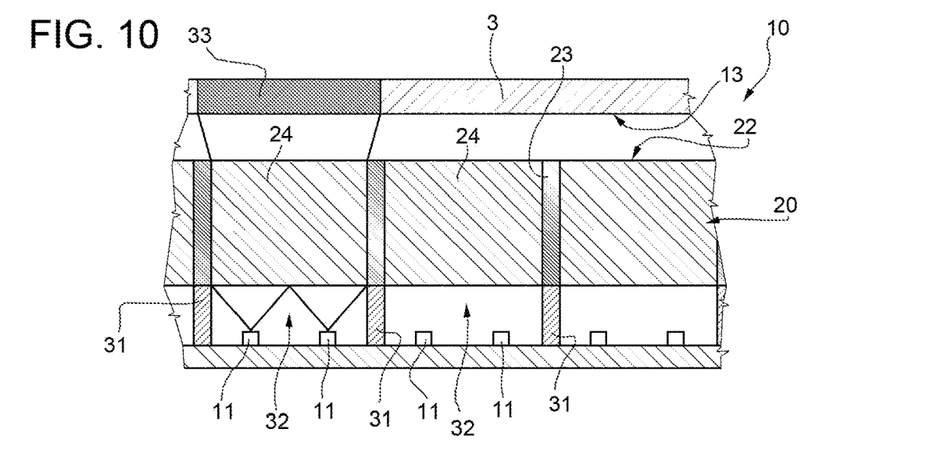
FIG. 10 is similar to FIG. 2 and shows a further variant of the LED indicating device of the present invention.

According to the variant in FIG. 10, elements 24 of body 20 are not defined by filaments but by blocks, for example having a parallelepiped shape. This variant is advantageous when it you need to train, in the 3, luminous geometric patterns with a particular shape are to be formed in window 3. In the case of transparent blocks shaped as a parallelepiped, for example, it is possible to form respective lighted rectangles 33 in window 3. In particular, optionally in combination with the presence of screens 31, this device may be used to obtain the same optical effect as a sector light bar seen in FIG. 9.

In the light of the above, it is apparent that body 20 of device 10 allows the light to be guided from the LED sources 11 to surface 13, prevent interferences by the light emitted by nearby sources, and prevent strong dispersion of the light which is guided, so as to obtain a lighted area with clear contours. At the same time, without the need for additional screens arranged between the LED sources 11, it is possible to arrange the latter in relatively close positions, so that all filaments 24 of body 20 are illuminated at surface 21 and are therefore affected by the transport of light.

Thereby, a light area may be obtained, for example a light bar 15, which is lit in a continuous progressive manner rather than in segments.

At the same time, the LED sources 11 are controlled individually, i.e. they may be switched on/off and/or may emit light with variable intensity independently of one another. Thereby, it is possible to have great flexibility in providing light information on the graphic area: for example, a marker may be formed on a bar-graph or device 10 may be used as any display.

Moreover, special measures may be adopted to also obtain a segment lighting and/or special light effects and/or special patterns in window 3, if desired. Therefore, body 20 makes the design of the graphic areas in the instrument cluster 1 more flexible, as may be seen for example in the applications in FIGS. 5 to 10.

Moreover, matrix 23 and elements 24 are made of flexible materials, it is possible to adapt body 20 to spaces and/or geometries other than those traditional available in the prior art.

Finally, it is apparent that changes and variants may be made to device 10 described with reference to the accompanying figures which do not fall outside the scope of protection of the present invention, as defined in the appended claims.

In particular, the shape and size of body 20 may be different from those indicated as an example; and/or the LED sources 11 may be defined by traditional LEDs.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. An LED indicating device, in particular for a vehicle instrument cluster, the device comprising:

a plate comprising at least one light permeable portion, the light permeable portion having a rear surface;

a plurality of LED sources arranged in a position spaced apart from said rear surface;

a light guide comprising a body distinct from said plate and interposed between said LED sources and said rear surface;

a control unit acting to control the power supply to said LED sources;

said body having a first surface facing said LED sources and a second surface facing said rear surface and including:

a matrix made of a light impermeable material;

a plurality of light permeable elements, which are embedded in said matrix and continuously extend from said first surface to said second surface;

wherein:
said light permeable elements are embedded in said matrix in positions spaced apart from one another;
said second surface is spaced apart from said rear surface.

2. The device as set forth in claim 1, wherein said control unit acts to control the power supply to said LED sources independently of one another.

3. The device as set forth in claim 2, wherein said control unit acts to control the switching on/off of said LED sources independently of one another.

4. The device as set forth in claim 2, wherein said control unit acts to control a change in the light intensity of said LED sources independently of one another.

5. The as set forth in claim 1, wherein said light permeable elements are defined by respective filaments.

6. The device as set forth in claim 1, wherein said light permeable elements are defined by respective optical fibers.

7. The device as set forth in claim 1, wherein said matrix and said light permeable elements are elastically flexible.

8. The device as set forth in claim 1, wherein said LED sources are defined by respective caseless electronic circuits.

9. The device as set forth in claim 1, wherein said second surface directly faces said rear surface.

10. The device as set forth in claim 1, wherein said first surface directly faces said LED sources.

11. The device as set forth in claim 5, wherein said filaments are parallel to each other.

12. A vehicle instrument cluster comprising:
an LED indicating device as set forth in claim 1 and
a dial defined by said plate.

\* \* \* \* \*